HIGH PRESSURE EXPANSIBLE CHAMBER DEVICE

Original Filed Jan. 13, 1971 2 Sheets-Sheet 1

HIGH PRESSURE EXPANSIBLE CHAMBER DEVICE

Original Filed Jan. 13, 1971 2 Sheets-Sheet 2

United States Patent

Re. 28,441

Reissued June 3, 1975

28,441

HIGH PRESSURE EXPANSIBLE CHAMBER DEVICE

Wayne B. Easton, 3007 W. 96th St. Circle, Bloomington, Minn. 55431

Original No. 3,687,581, dated Aug. 29, 1972, Ser. No. 106,047, Jan. 13 1971. Application for reissue July 18, 1974, Ser. No. 489,525

Int. Cl. F01c *21/00;* F03c *3/00;* F04c *15/00*

U.S. Cl. 418—270 5 Claims

Matter enclosed in heavy brackets [ ] appears in the original patent but forms no part of this reissue specification; matter printed in italics indicates the additions made by reissue.

ABSTRACT OF THE DISCLOSURE

The invention relates to an expansible chamber type of device which is especially adapted for use with high pressure operating fluids. The device has a valve which directs pressurized fluid from an inlet port to the expanding chambers thereof and non-pressurized fluid from the contracting chambers thereof to an outlet port. A valve sealing arrangement is provided whereby pressurized fluid is utilized to bias the valve into sealing engagement with a valve block which contains passages leading to the expanding and contracting chambers. A main feature is that the inlet and outlet ports are reversible from the standpoint that either port may be used as the inlet port to obtain a desired direction of rotation without adversely affecting the operativeness of the sealing arrangement.

The invention relates to an expansible chamber type of device which is especially adapted for use with high pressure operating fluids. Such devices commonly have a valve which directs pressurized fluid from an inlet port to the expanding chambers thereof and non-pressurized or spent fluid from the contracting chambers thereof to an outlet port.

A sealing arrangement must be provided for and in connection with such a valve to prevent or deter the short circuiting of pressurized fluid from the high pressure side to the low pressure side or from the high pressure side through a shaft seal to a point externally of the device.

The expansible chamber device of the present invention is provided with a sealing arrangement in which (1) the high pressure fluid is transferred across only one pair of relatively movable surfaces which are the surfaces of a valve, (2) the valve surfaces are biased together by the pressurized operating fluid, and (3) the inlet and outlet ports are reversible from the standpoint that either port may be used as the inlet port to obtain a desired direction of rotation without adversely affecting the operativeness of the sealing arrangement.

The object of the invention is to provide an expansible chamber type of device having a new and improved valve biasing and sealing arrangement.

Other objects and advantages of the invention will become apparent from the following specification, drawings and appended claims.

Figure 1:
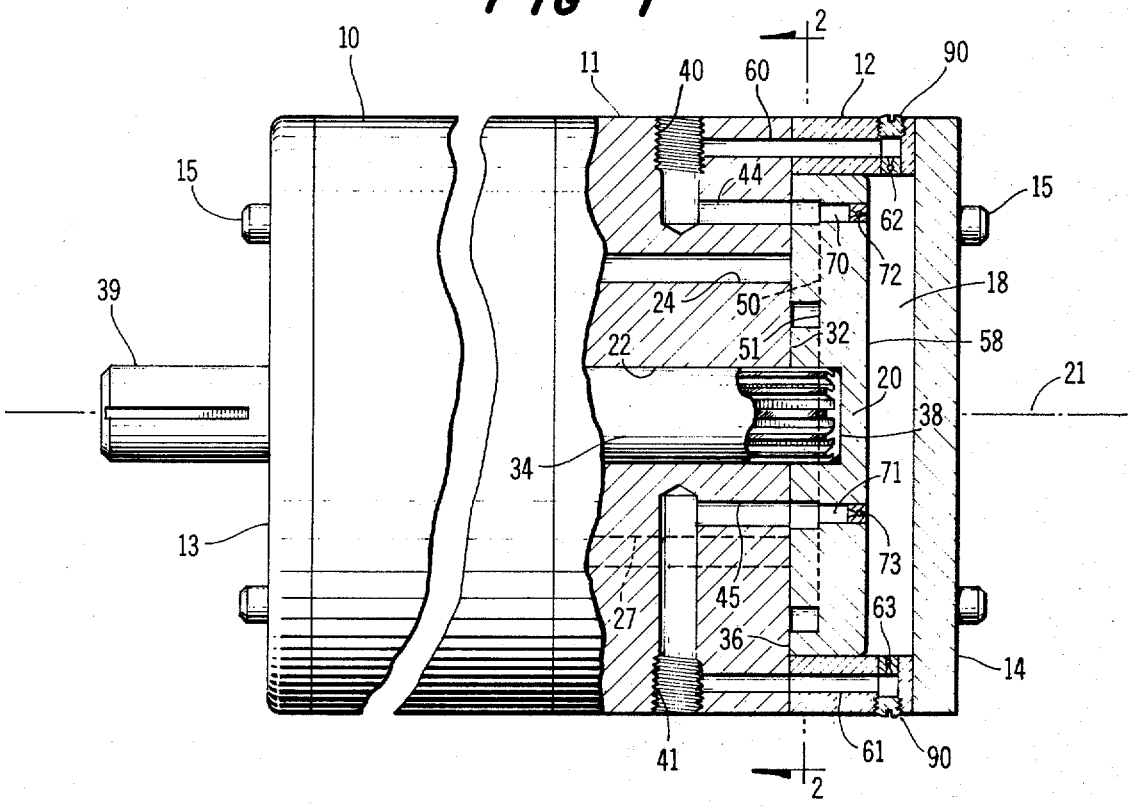
FIG. 1 is a longitudinal sectional view of an expansible chamber type of motor, pump, metering device or the like having a new and improved valving arrangement in accordance with the invention, taken on line 1—1 of FIG. 2.

The drawing illustrates an expansible chamber type of device which will be referred to herein as a motor, for convenience, but which may be, within the scope of the invention, a motor, a pump, a metering device, or any other type of device of the expansible chamber type.

The illustrated motor comprises three cylindrically shaped casing sections 10, 11 and 12 and disk shaped end cover plates 13 and 14, these parts being secured together by bolt means 15.

Casing section 10 houses an expansible chamber mechanism which is not specifically illustrated because it may be entirely conventional and because it may be any one of several known types of such mechanisms. Examples of expansible chamber mechanisms are found in U.S. Pat. No. 2,095,255 which discloses types having radially and axially movable pistons, U.S. Pat. No. 3,272,142 which discloses a rotary piston or gerotor type and U.S. Pat. No. 2,169,456 which discloses axially movable pistons.

Casing section 11 is adjacent the expansible chamber mechanism housed by casing section 10 and is referred to herein as a valve block 11. Casing section 12 adjacent valve block 11 is cylindrically and annularly shaped and forms, with cover plate 14, a valve chamber 18 which houses a cylindrically shaped valve 20.

The motor or expansible chamber device has a central, longitudinally extending axis 21 and valve block 11 has a longitudinally extending bore 22 having an axis which is coaxial with the axis 21. Valve block 11 has a plurality of axially extending feeding and exhausting passages 24 to 30 which are circumferentially arranged relative to the axis 21 and which have port openings in the annularly shaped fluid transfer surface 32 of valve block 11. The passage arrangement comprising the passages 34 to 30 is in itself old and is commonly used for feeding and exhausting fluid to and from expansible chamber devices. Each such passage alternately has fluid flowing therethrough to the left to an expanding chamber and subsequently therethrough to the right while the same chamber is contracting or collapsing. Passages 24 to 30 will be referred to more in detail further on herein in connection with an explanation of the valve 20.

A shaft 34 is rotatably disposed within valve block bore 22 and is connected to valve 20 in driving relation thereto. Valve 20 has a valve face 36 which engages the valve block fluid transfer surface 32. Valve 20 is illustrated as being rotatably about the axis 21 but, as will be explained further on, valve 20 may have different forms of motion as well as different configurations, within the scope of the invention. As illustrated, however, a spline connection 38 is provided between valve 20 and shaft 34 which facilitates the joint rotation of the shaft and valve but allows the valve to be biased into sealing engagement with the valve block 11 without any hindrance from the shaft.

A rotatable shaft 39 is drivingly connected to the expansible chamber means (not shown) housed in the casing section 10 and may or may not, depending on the type of expansible chamber device being utilized, be directly connected to the shaft 34. Valve block 11 has radially extending inlet and outlet ports 40 and 41 which are reversible in the sense that either port 40 or 41 may be the inlet port so that the expansible chamber device will be operated in one direction or the other so that shaft 39 may be rotated in either direction as desired. Axially extending passages 44 and 45 respectively intersect ports or passages 40 and 41 and have port openings in the annular fluid transfer surface 32 of valve block 11 at different radial distances from the axis 21.

Figure 2:
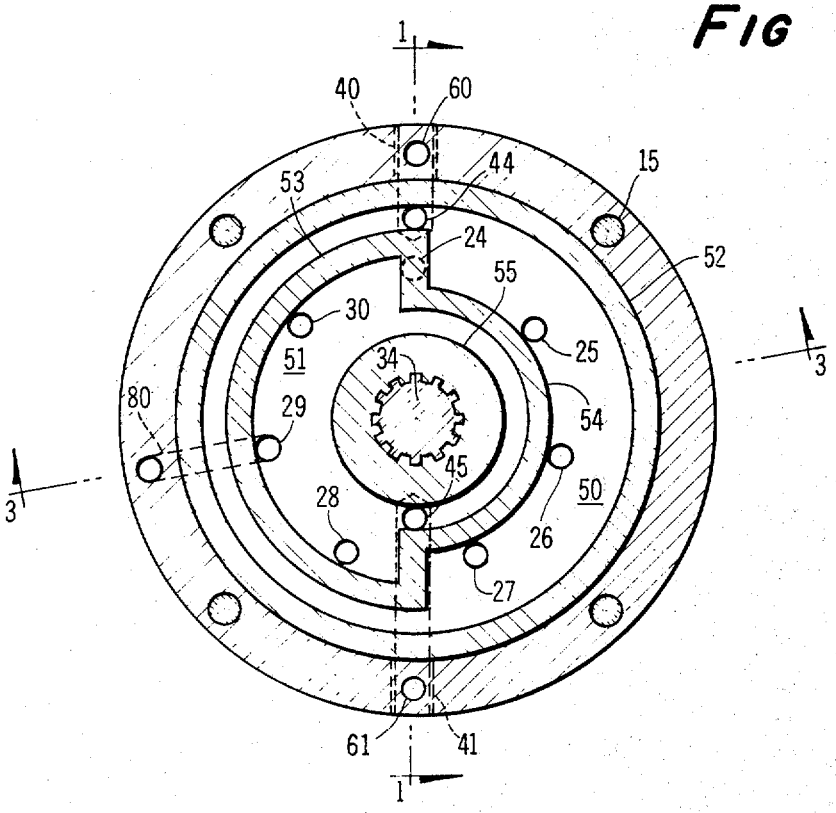
FIG. 2 is a transverse sectional view taken on line 2—2 of FIG. 1.

Valve 20 is illustrated with a known type of fluid flow distribution pattern (referred to herein for convenience as FFDP) formed in the valve face 36 as may be best seen in FIG. 2. The FFDP of any valve used must have separate and distinct fluid feeding and exhausting sections and either of such sections will be the feeding section (and the other the exhausting section) depending upon which of the ports 40 or 41 is the inlet port. In valve 20, feeding and exhausting sections are formed with two sections 50 and 51 which are recessed relative to the valve face 36. Assuming port 40 to be the inlet port, section 50 will be the feeding section and section 51 will be the exhausting section. Feeding section 50 is formed by the circular wall 52, and the radially offset semicircular walls 53 and 54, and includes feeding port 44 within its confines. Exhausting section 51 is formed by the walls 53 and 54 and the central circular wall 55 which surrounds the end of shaft 34. Exhausting section 51 includes exhausting port 45 within its confines.

If port 40 is used as the inlet port, valve lock passages 40 and 44 and valve section 50 form fluid inlet path means; concomitantly valve section 51 and valve block passages 45 and 41 form fluid outlet path means. If port 41 is used as the inlet port, valve block passages 41 and 45 and valve section 51 form fluid inlet path means, concomitantly valve section 50 and valve block passages 44 and 40 form fluid outlet path means.

Upon valve 20 being rotated, and assuming port 40 is the inlet port, the passages 24 to 30 which are within the confines of feeding section 50, will convey fluid from the port 40 to expanding chambers of the expansible chamber device housed by casing section 10; likewise the passages 24 to 30 which are within the confines of exhausting section 51 will convey fluid from the collapsing chambers of the expansible chamber device to the port 41.

It will be understood that the above described flow conditions would be reversed if port 41 were the inlet port and in that case the valve section 51 would be the feeding section.

The description of the invention which follows is equally applicable to various other types of valve arrangements such as those disclosed in my pending patent application Ser. No. 670,962 filed Sept. 27, 1967 in which each of three valves disclosed therein has a different type or form of FFDP. Likewise shafts for driving the valve having other forms than the disclosed shaft 34 may be utilized in well known ways depending on the particular form of valve chosen. As a criteria it is only essential that the valve be free to be biased by pressure against the valve block surface 32.

It may be observed that pressurized fluid admitted through port 40 or 41 would flow to the recessed valve section 50 or 51 and the pressure exerted on the recessed area would tend to force the valve to the right in a direction away from the valve block 11. In accordance with the invention, means are provided for admitting fluid to the chamber or space 18 between the valve 20 and the cover plate 14 which results in a larger net force, by reason of a relatively larger area of the back side 58 of the valve being acted upon by pressurized fluid, which biases the valve in the direction of the valve block 11. The spacing between the back side 58 of the valve 20 and the cover plate 14 is shown as being relatively large for the purpose of illustration but in practice such spacing may be as small as a few thousandths of an inch or even less than a thousandth of an inch.

In the motor illustrated there are included three functionally independent systems for supplying pressurized fluid to the chamber 18 to the rear of valve 20. It will thus be understood that any one of the three systems, or a combination of two of the systems, may be used to the exclusion of the others to pressurize the chamber 18.

Figure 4:
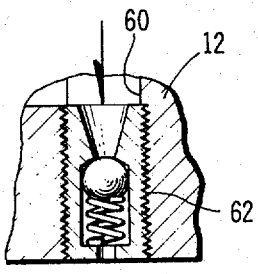
FIG. 4 is an enlarged sectional view of a conventional check valve of which a plurality thereof are utilized in the illustrated embodiment of the invention.

The first valve biasing system comprises two passages 60 and 61 each formed jointly in the valve block 11 and casing section 12 with passages 60 and 61 extending respectively from ports 40 and 41 to the space in chamber 18 behind valve 20. Identically constructed check valves 62 and 63 are mounted respectively in passages 60 and 61 such that pressurized fluid may flow from either or both ports 40 and 41 through the valves 61 and 62 to the chamber 18 but pressurized fluid is stopped from flowing from chamber 18 through the check valves 62 or 63 to the passages 60 or 61. FIG. 4 shows check valve 62 in detail and check valve 63 is identical to check valve 62.

In the operation of a motor equipped with the first type of valve biasing system, pressurized fluid is introduced through port 40 or 41 depending on the direction of rotation desired for shaft 39. If the fluid is introduced through "inlet" port 40, valve section 50 is pressurized and, with the valve in its position as shown in FIG. 2, pressurized fluid would flow through passages 25 to 27 to expanding chambers of the expansible chamber device housed in casing section 10. Concomitantly, fluid would flow from contracting chambers of said device through passages 28 to 30 to the valve section 51 from which it would flow through the passage 45 to the "outlet" port 41. Shaft 34 and valve 20 rotate in synchronism with the operation of the expansible chamber device and, as may be visualized by reference to FIG. 2, each of the passages 24 to 30 communicates alternately with the valve sections 50 and 51 and the passages 24 to 30 are sequentially fed and exhausted by the valve sections 50 and 51.

Pressurized fluid in "inlet" port 40 enters passage 60 and flows through the check valve 62 into valve chamber 18 between the back side 58 of the valve and cover plate 14. Check valve 63 prevents pressurized fluid from entering passage 61 and the pressurized fluid acting on valve surface 58 biases the valve into sealing engagement with the valve block 11. As the area of each of the valve sections 50 and 51 is less than the area of valve side 58, there will always be a net force biasing the valve in the direction of the valve block 11 even though the fluid pressure for valve sections 50 and 51 is substantially the same as the fluid pressure in valve chamber 18.

If it were desired to reverse the direction of rotation for shaft 39, pressurized fluid would be admitted to the "inlet" port 41 and pressurized fluid would be admitted to valve chamber 18 through passage 61 and check valve 63. Check valve 62 would prevent the entry of pressurized fluid to passage 60.

The second version of the valve biasing system comprises passages 70 and 71 in valve 20 which extend respectively from the recessed surfaces of the valve sections 50 and 51 to the back side 58 of valve 20. The passages 70 and 71 have check valves 72 and 73 installed therein each allowing only one way flow to the valve chamber 18. Check valves 72 and 73 may be identical to check valve 62 shown in detail in FIG. 4.

Assuming that passages 60 and 61 and check valves 62 and 63 are not present or omitted, pressurized fluid in "inlet" port 40 flows through valve block passage 44 to valve section 50 and through passage 70 and check valve 72 to valve chamber 18. Check valve 73 prevents pressurized fluid from entering passage 71 and the pressurized fluid acting on the back side valve surface 58 biases the valve into sealing engagement with the valve block 11.

The area of each of the valve sections 50 and 51 being less than the area of valve side 58 and there thus will always be a net force biasing the valve in the direction of the valve block 11 even through the fluid pressure for valve sections 50 and 51 is substantially the same as the fluid pressure in valve chamber 18.

If it were desired to reverse the direction of rotation of shaft 39, pressurized fluid would be admitted to the "inlet" port 41 and pressurized fluid would be admitted to valve chamber 18 through valve passage 71 and check valve 73. Check valve 72 would then prevent the entry of pressurized fluid to passage 70.

Combinations of the first and second versions of the invention could be utilized in which either the passages associated with check valves 62 and 73, on the one hand, or the passages associated with 63 and 72, on the other hand, would provide a suitable valve biasing system with regard to pressurizing the valve chamber 18.

Figure 3:
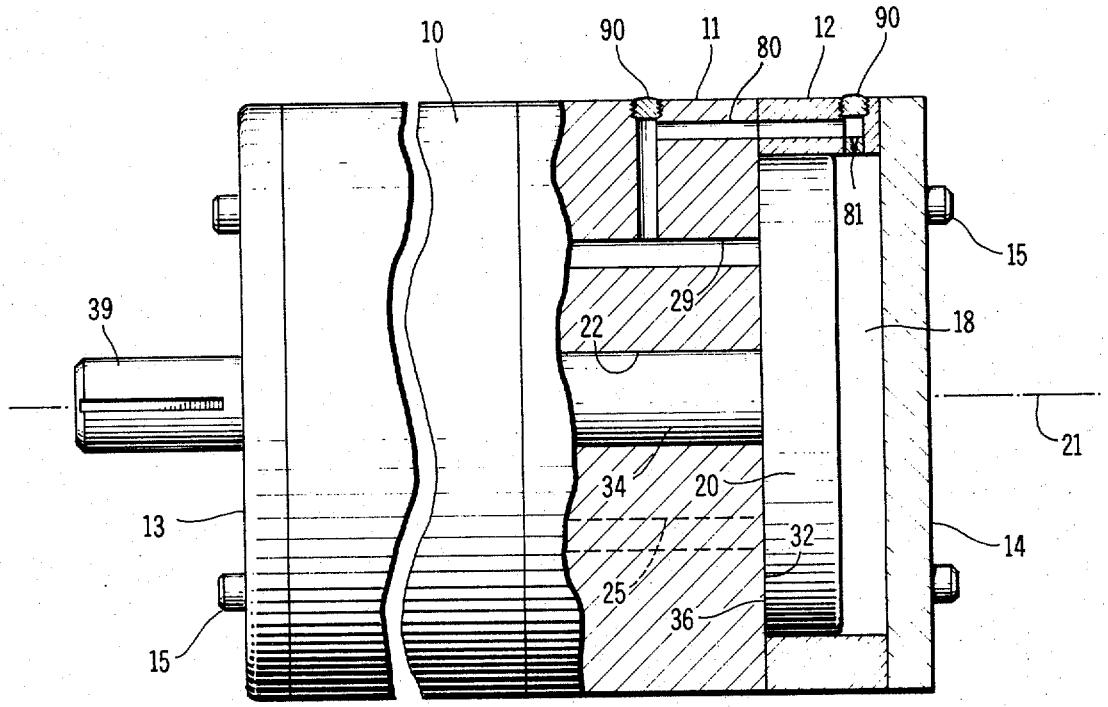
FIG. 3 is a fragmentary longitudinal sectional view taken on line 3—3 of FIG. 2.

The third version of valve biasing system comprises, as can be seen in FIG. 3, a passage 80 formed jointly in valve block 11 and casing section 12 which extends from valve block passage 29 to the chamber 18. The passage 80 has a check valve 81 installed therein which allows one way flow to the valve chamber 18. Check valve 81 may have the same construction as the check valve 62 shown in FIG. 4. Assuming that the passages (60, 61, 70, 71) and check valves (62, 63, 72, 73) of the first and second valve biasing systems described above are not present, pressurized fluid introduced to either "inlet" port 50 or "inlet" port 41 results, in accordance with the operation of the motor as explained above, in each of the valve block passages 24 to 30 alternately directing pressurized fluid to the expansible chamber device and directing spent, pressureless fluid away from said device. The FFDP of valve 20 causes valve block passage 29 to be pressurized and depressurized during each revolution of the valve 20 and, during the pressurization thereof, fluid tends to flow from passage 29 through passage 80 and check valve 81 to valve chamber 18 behind valve 20. When valve block passage 29 is depressurized the check valve 81 prevents fluid in chamber 18 from entering passage 80. The pressurized fluid in chamber 18 biases valve 20 towards valve block 11 in the same manner as with the first and second valve biasing systems described above. The passage 80 could be connected with any one of the other valve block passages 24 to 28 or 30 also and it is only incidental that it is illustrated as being connected to the valve block passage 29.

As valve block passage 29 is only alternately pressurized, valve chamber 18 is not subjected to a constantly applied pressure as in the cases of the above described first and second valve biasing systems. A form of an accumulator or some other kind of energy storing device could be provided for chamber 18 so that a substantially constant pressure would be maintained in chamber 18 despite the fact that passage 80 would be only alternately pressurized by valve block passage 29. Alternatively, all of the valve block passages could be provided with check valve equipped passages leading to valve chamber 18 to maintain a constant pressure therein and in that case an accumulator device would not be needed.

Fluid tight casing plugs 90 are illustrated but it will be understood that they have no particular significance other than to permit conventional drilled through holes for the fluid passages.

I claim:

1. A fluid pressure operated device of the expansible chamber type comprising a casing, a valve block having a fluid transfer surface, said valve block having a plurality of expansible chamber feeding and exhausting passages having openings in said transfer surface, a valve having a first surface engaging said transfer surface, said valve first surface being recessed to form reversible feeding and exhausting sections, reversible inlet and outlet passages in said valve block having openings in said transfer surface and respective constant fluid communication with said feeding and exhausting sections of said valve, said valve being cyclically movable relative to said transfer surface with said feeding and exhausting sections thereof sequentially feeding and exhausting said expansible chamber passages, said valve having a second surface on the opposite side thereof from said first surface, a valve biasing pressure chamber formed by an internal surface of said casing and said second valve surface, passage means between at least one of said expansible chamber passages and said pressure chamber, check valve means for said passage means allowing fluid therein to flow in only one direction to said pressure chamber for biasing said valve towards said valve block transfer surface, said valve biasing pressure chamber having no openings other than openings for said check valve means, and drive means attached to said valve and extending in a direction away from said valve biasing pressure chamber, said second valve surface being between said drive means and said valve biasing pressure chamber.

2. A fluid pressure operated device of the expansible chamber type comprising a casing, a valve block having a fluid transfer surface, said valve block having a plurality of expansible chamber feeding and exhausting passages having openings in said transfer surface, a valve having a first surface engaging said transfer surface, said valve first surface being recessed to form *a* [reversible] feeding [and exhausting sections] *section,* [reversible] *an* inlet [and outlet passages] *passage* in said valve block having [openings] *an opening* in said transfer surface and [respective] constant fluid communication with said feeding [and exhausting sections] *section* of said valve, said valve block inlet passage and said valve feeding section forming fluid inlet path means, [said valve block outlet passage and said valve exhausting section forming fluid outlet path means,] said valve being cyclically movable relative to said transfer surface with said feeding [and exhausting sections] *section* thereof sequentially feeding [and exhausting] said expansible chamber passages, *means for sequentially exhausting said expansible chamber passages,* said valve having a second surface on the opposite side thereof from said first surface, a valve biasing pressure chamber formed by an internal surface of said casing and said second valve surface, passage means between [each of] said fluid inlet [and outlet] path means and said pressure chamber [, check valve means] for [said passage means] allowing fluid therein to flow [in only one direction] to said pressure chamber for biasing said valve towards said valve block transfer surface, [said valve biasing pressure chamber having no openings other than openings for said check valve means,] *said valve being the only cyclically movable member with which pressurized fluid in said chamber has contact,* and drive means attached to said valve and extending in a direction away from said valve biasing pressure chamber, said second valve surface being between said drive means and said valve biasing pressure chamber.

3. A fluid pressure operated device of the expansible chamber type comprising a casing, a valve block having a fluid transfer surface, said valve block having a plurality of expansible chamber feeding and exhausting passages having openings in said transfer surface, a valve having a first surface engaging said transfer surface, said valve first surface being recessed to form reversible feeding and exhausting sections, reversible inlet and outlet passages in said valve block having openings in said transfer surface and respective constant fluid communication with said feeding and exhausting sections of said valve, said valve block inlet passage and said valve feeding section forming fluid inlet path means, said valve block outlet passage and said valve exhausting section forming fluid outlet path means, said valve being cyclically movable relative to said transfer surface with said feeding and exhausting sections thereof sequentially feeding and exhausting said expansible chamber passages, said valve having a second surface on the opposite side thereof from said first surface, a valve biasing pressure chamber formed by an internal surface of said casing and said second valve surface, passage means between each of said fluid inlet and outlet path means and said pressure chamber, check valve means for said passage means allowing fluid therein to flow in only one direction to said pressure chamber for biasing said valve towards said valve block transfer surface, said valve biasing pressure chamber having no openings other than openings for said check valve means, and drive means attached to said valve and extending in a direction away from said valve biasing pressure chamber, said second valve surface being between said drive means and said valve biasing pressure chamber.

4. A device according to claim 3 wherein said passage means are between said reversible inlet and outlet passages of said valve block and said pressure chamber.

5. A device according to claim 3 wherein said passage means are between said reversible feeding and exhausting sections of said valve and said pressure chamber.

References Cited

The following references, cited by the Examiner, are of record in the patented file of this patent or the original patent.

UNITED STATES PATENTS

| | | | |
|---|---|---|---|
| 2,756,726 | 7/1956 | Ainsworth | 91—180 |
| 2,884,865 | 5/1959 | Pettibone | 418—133 |
| 2,970,578 | 2/1961 | Kohtaki | 91—180 |
| 2,984,223 | 5/1961 | Budzich | 91—485 |
| 3,160,072 | 12/1964 | Martin | 418—133 |
| 3,194,172 | 7/1965 | Schottler | 91—485 |

JOHN J. VRABLIK, Primary Examiner

U.S. Cl. X.R.

251—175